United States Patent
Kim et al.

(10) Patent No.: US 9,888,454 B2
(45) Date of Patent: Feb. 6, 2018

(54) METHOD AND APPARATUS FOR EFFICIENT MOBILITY MANAGEMENT IN HETEROGENEOUS NETWORK ENVIRONMENT

(71) Applicants: LG ELECTRONICS INC., Seoul (KR); KOREA ADVANCED INSTITUTE OF SCIENCE AND TECHNOLOGY, Daejeon (KR)

(72) Inventors: JaYeong Kim, Seoul (KR); Hansung Leem, Seoul (KR); Dan Keun Sung, Seoul (KR); Yunjung Yi, Seoul (KR); Byounghoon Kim, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/129,362

(22) PCT Filed: Mar. 27, 2015

(86) PCT No.: PCT/KR2015/003074
§ 371 (c)(1),
(2) Date: Sep. 26, 2016

(87) PCT Pub. No.: WO2015/147602
PCT Pub. Date: Oct. 1, 2015

(65) Prior Publication Data
US 2017/0181122 A1 Jun. 22, 2017

Related U.S. Application Data

(60) Provisional application No. 61/971,508, filed on Mar. 27, 2014.

(51) Int. Cl.
*H04W 68/02* (2009.01)
*H04W 8/02* (2009.01)
*H04W 84/04* (2009.01)

(52) U.S. Cl.
CPC ............. *H04W 68/02* (2013.01); *H04W 8/02* (2013.01); *H04W 84/045* (2013.01)

(58) Field of Classification Search
CPC .... H04W 68/00; H04W 68/02; H04W 68/025
See application file for complete search history.

(56) References Cited

U.S. PATENT DOCUMENTS 8,504,072 B2 * 8/2013 Ishii ....................... H04W 8/06
370/259
2011/0300807 A1 12/2011 Kwun et al.
(Continued)

FOREIGN PATENT DOCUMENTS

| KR | 1020110133921 A | 12/2011 |
|---|---|---|
| KR | 1020120111248 A | 10/2012 |
| WO | 2010123309 A2 | 10/2010 |

OTHER PUBLICATIONS

Ericsson, "Issues with the CT4 solution for the PWS Restart Indication Message", 3GPP TSG-RAN #63, RP-140266, Feb. 25, 2014, 6 pages.

*Primary Examiner* — Daniel Lai
*Assistant Examiner* — Frank Donado
(74) *Attorney, Agent, or Firm* — Lee, Hong, Degerman, Kang & Waimey

(57) ABSTRACT

The present specification suggests a method and an apparatus for more efficient mobility management through a hierarchical structure of a micro mobility management entity (MME) and a macro MME in a mobile communication system. Particularly, a second MME establishes a connection with a plurality of small cells included in a single macro cell. The second MME manages a single particular macro (Continued)

cell, and a first MME manages a plurality of macro cells, thereby providing a hierarchical structure. Additionally, the second MME transmits a paging message to a small cell in which a terminal is positioned, among the plurality of small cells included in a single macro cell. The second MME has information on the position of the terminal and can transmit the paging message to a particular small cell in which the terminal is positioned.

8 Claims, 11 Drawing Sheets

(56) References Cited

U.S. PATENT DOCUMENTS

| | | |
|---|---|---|
| 2013/0059611 A1 | 3/2013 | Takechi |
| 2014/0004850 A1 | 1/2014 | Kwon et al. |
| 2014/0302880 A1* | 10/2014 | Godin ................. H04W 68/02 455/458 |

* cited by examiner

METHOD AND APPARATUS FOR EFFICIENT MOBILITY MANAGEMENT IN HETEROGENEOUS NETWORK ENVIRONMENT

CROSS-REFERENCE TO RELATED APPLICATIONS

This application is the National Stage filing under 35 U.S.C. 371 of International Application No. PCT/KR2015/003074, filed on Mar. 27, 2015, which claims the benefit of U.S. Provisional Application No. 61/971,508, filed on Mar. 27, 2014, the contents of which are all hereby incorporated by reference herein in their entirety.

BACKGROUND OF THE INVENTION

Field of the Invention

This specification relates to mobile communication and, more particularly, to a method and apparatus for an efficient configuration of a Mobility Management Entity (MME) and a Serving Gateway (S-GW) in a mobile communication system.

Related Art

Generally, a mobile communication system has been developed to provide users with voice services while ensuring mobility of the user. However, the mobile communication system has gradually extended its area of service from voice services to data services, and, presently, the mobile communication system has evolved to a level of being capable of providing high rate (or high speed) data services. However, in the mobile communication system through which the current services are being provided, due to a lack of resources and the users' growing request for faster services, a more evolved mobile communication system is being required.

In order to meet with such requirements, as one of the next generation mobile communication systems, standardization processes for Long Term Evolution (LTE) and LTE-Advanced (LTE-A) in the 3rd Generation Partnership Project (3GPP) are being carried out. The commercial usage of the LTE has been initiated since year 2010, and this corresponds to a communication technology that realizes high-rate packet based communication having a maximum transmission rate of approximately 100 Mbps. And, an LTE-A system, which is an enhanced version of the LTE system, is capable of supporting a maximum transmission rate of several hundreds of Mbps. However, in case the number of user equipments (UEs) being serviced within a single base station increases, since the user equipments are required to share the provided resources, even if the actual system performance can support the transmission of high-rate packets, the UE may actually be provided with a low-rate data service. Therefore, in order to resolve such problems, as a solution for extending the service area or expanding network capacity, the adoption of micro base stations or Pico base stations having a service area that is narrower than the conventional Macro base station in the network or the adoption of a large number of small-sized base stations, such as installing Femto cell base stations, which only establish one service area for one household is being considered.

However, in case the number of small-sized cells, such as Femto cells, is equal to several hundreds of thousands or more, this leads to an increase in the overhead of a core network (CN), which corresponds to an ultra high-speed network that controls all of the small-sized cells and that interconnects diverse sub-networks. Therefore, diverse methods for reducing the overhead are being considered.

SUMMARY OF THE INVENTION

Technical Objects

The present invention provides a method and apparatus for an efficient mobility management through a hierarchical structure of a micro MME and a macro MME.

Technical Solutions

According to an exemplary embodiment, a second MME configures a connection between the second MME and a plurality of small cells being included in one macro cell. The first MME may configure a hierarchical architecture (or structure) between the first MME and the second MME by allocating the second MME between the direct connection between the first MME and the plurality of macro cells and/or small cells. More specifically, the second MME manages one specific macro cell, and the first MME manages a plurality of macro cells. Thereafter, the second MME transmits a paging message to a small cell in which a user equipment is located, among the plurality of small cells included in one macro cell. Herein, the second MME carries position information respective to the small cell in which the user equipment is located. Therefore, without having to transmit the paging message to all of the small cells, the paging message may be transmitted only to a specific small cell in which the user equipment is located. According to the exemplary embodiment, the first MME may be referred to as a macro MME, and the second MME may be referred to as a micro MME.

According to another exemplary embodiment, the first Micro MME managing a first Tracking Area (TA) configures a connection with a first macro cell and a first small cell being included in the first TA. Also, the second Micro MME managing a second Tracking Area (TA) configures a connection with a second macro cell and a second small cell being included in the second TA. Unlike the related art wherein the first macro MME managed all of the TAs, by adding a micro MME managing one TA in-between, a hierarchical architecture may be configured between the first macro MME and each micro MME. Thereafter, the first Micro MME transmits a first paging message to a small cell in which a user equipment is located, among the first small cells, and the second Micro MME transmits a second paging message to a small cell in which a user equipment is located, among the second small cells. As described above, the first Micro MME and the second Micro MME independently performs paging management with respect to the TAs managed by each of the first Micro MME and the second Micro MME. Herein, the first Micro MME carries position information respective to the first small cell in which the user equipment is located, and the second Micro MME carries position information respective to the second small cell in which the user equipment is located. Therefore, without having to transmit the paging message to all of the small cells, the first Micro MME and the second Micro MME may transmit the paging message to the respective specific small cells in which the correspond user equipment is located.

Effects of the Invention

As opposed to the macro cells and/or small cells being concentrated in one macro MME, by allocating micro MMEs in the base station (eNB) of the macro cell, the micro MMEs are capable of managing the small cells. By doing so, in case of a handover between the cells, which is carried out by a user equipment, the load that was concentrated in the macro MME may distributed (or dispersed), thereby allowing signaling overhead of the MME to be reduced. Additionally, in case the user equipment received paging from a cell, the paging overhead may be reduced by reducing the paging area unit. Accordingly, a more efficient mobility management may be achieved in the overall system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

A heterogeneous network that is generally used in the related art refers to networks that are different from one another, such as 3GPP LTE network, WiMAX network, and so on. And, these networks are finally connected to the Internet, thereby being capable of providing data communication services. However, a heterogeneous network environment that is used in this specification may include a communication service environment that can be provided in a network having different types of cells, such as a macro cell corresponding to a large-sized cell, a metro cell corresponding to a small-sized cell, an enterprise cell, and so on. More specifically, the heterogeneous network environment that is being used in this specification may include both of the concepts that are described above.

For clarity of explanation, the following description will focus on the 3GPP LTE or 3GPP LTE-A. However, the technical features of this description are not limited thereto.

Figure 1:
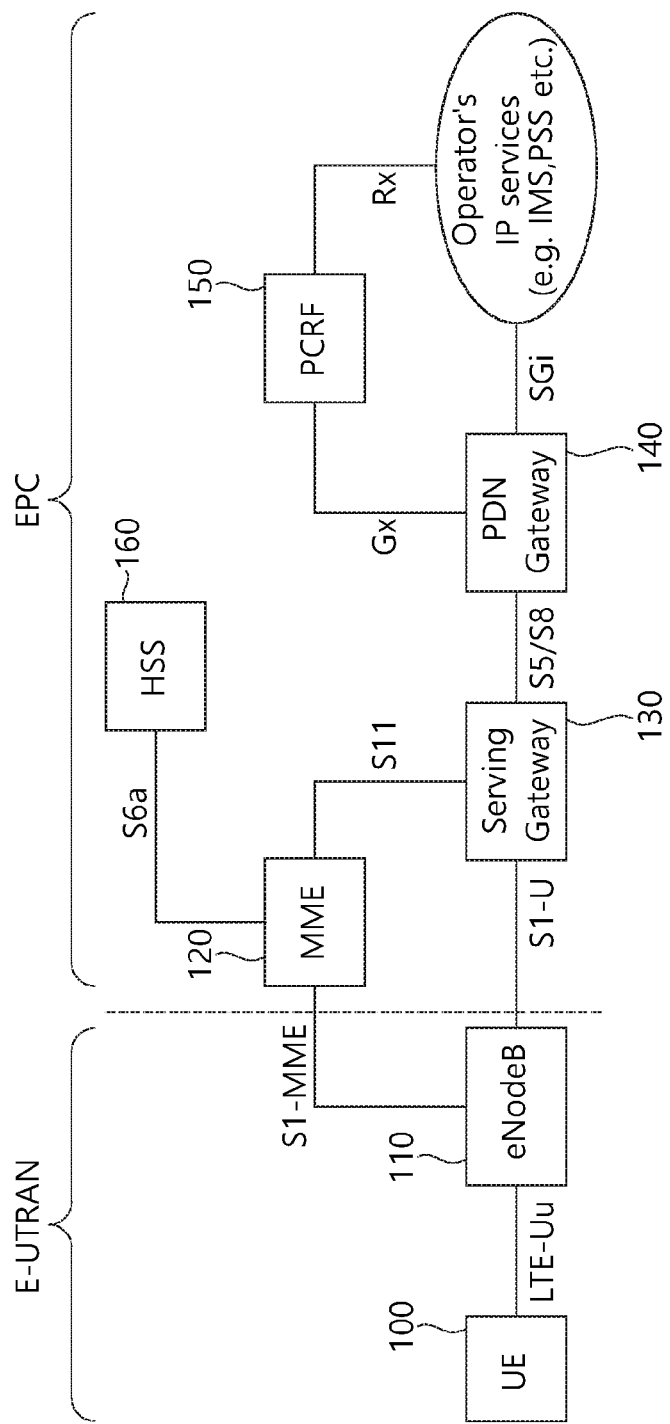
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The E-UTRAN includes at least one evolved-Node B (eNB) (or base station) 110, which provides a user plane and a control plane to a user equipment (UE) 100. The UE 100 may be fixed or may be mobile, and the UE may also be referred to by using diverse terms, such as Mobile Station (MS), User Terminal (UT), Subscriber Station (SS), Mobile Terminal (MT), wireless device, and so on. The eNodeB 110 may correspond to a fixed device (or apparatus) that communicates with the UE, and the eNodeB may also be referred to by using diverse terms, such as base station (BS), NodeB (NB), Base Transceiver Station (BTS), Access Point (AP), and so on.

A protocol that is known as an Access Stratum Protocol (AS protocol) is operated between the eNodeB 110 and the UE 100.

The EPC, which is also referred to as the core network (CN), controls the UE 100 and manages establishment of the bearers. As depicted in FIG. 1, the node (logical or physical) of the EPC in the SAE includes a Mobility Management Entity (MME) 120, a Serving Gateway (S-GW) 130, a PDN gateway (PDN-GW or P-GW) 140, a Policy and Charging Rules Function (PCRF) 150, a Home subscriber Server (HSS) 160, etc.

The MME 120 is the control node which processes the signaling between the UE 100 and the CN. The protocols running between the UE and the CN are known as the Non-Access Stratum (NAS) protocols. Examples of functions supported by the MME 120 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 130 serves as the local mobility anchor for the data bearers when the UE moves between eNodeBs. All user IP packets are transferred through the S-GW 130. The S-GW 130 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 140 serves to perform IP address allocation for the UE, as well as QoS enforcement and flow-based charging according to rules from the PCRF 150. The P-GW 140 performs QoS enforcement for Guaranteed Bit Rate (GBR) bearers. It also serves as the mobility anchor for inter-working with non-3GPP technologies such as CDMA2000 and WiMAX networks.

The PCRF 150 serves to perform policy control decision-making, as well as for controlling the flow-based charging functionalities.

The HSS 160, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined. More specifically, the eNodeB and the MME are connected by S1-MME, the eNodeB and the S-GW are connected by the S1-U, the S-GW and the P-GW are connected by S5/S8, and the MME and S-GW are connected by S11. The MME and HSS are connected by S6a, the P-GW and the PCRF are connected by Gx, the PCRF and the Operator's IP Services are connected by Rx, and the Pw and the Operator's IP Services are connected by SGi. Additionally, the eNodeBs are connected to one another through the X2 interface.

Figure 2:
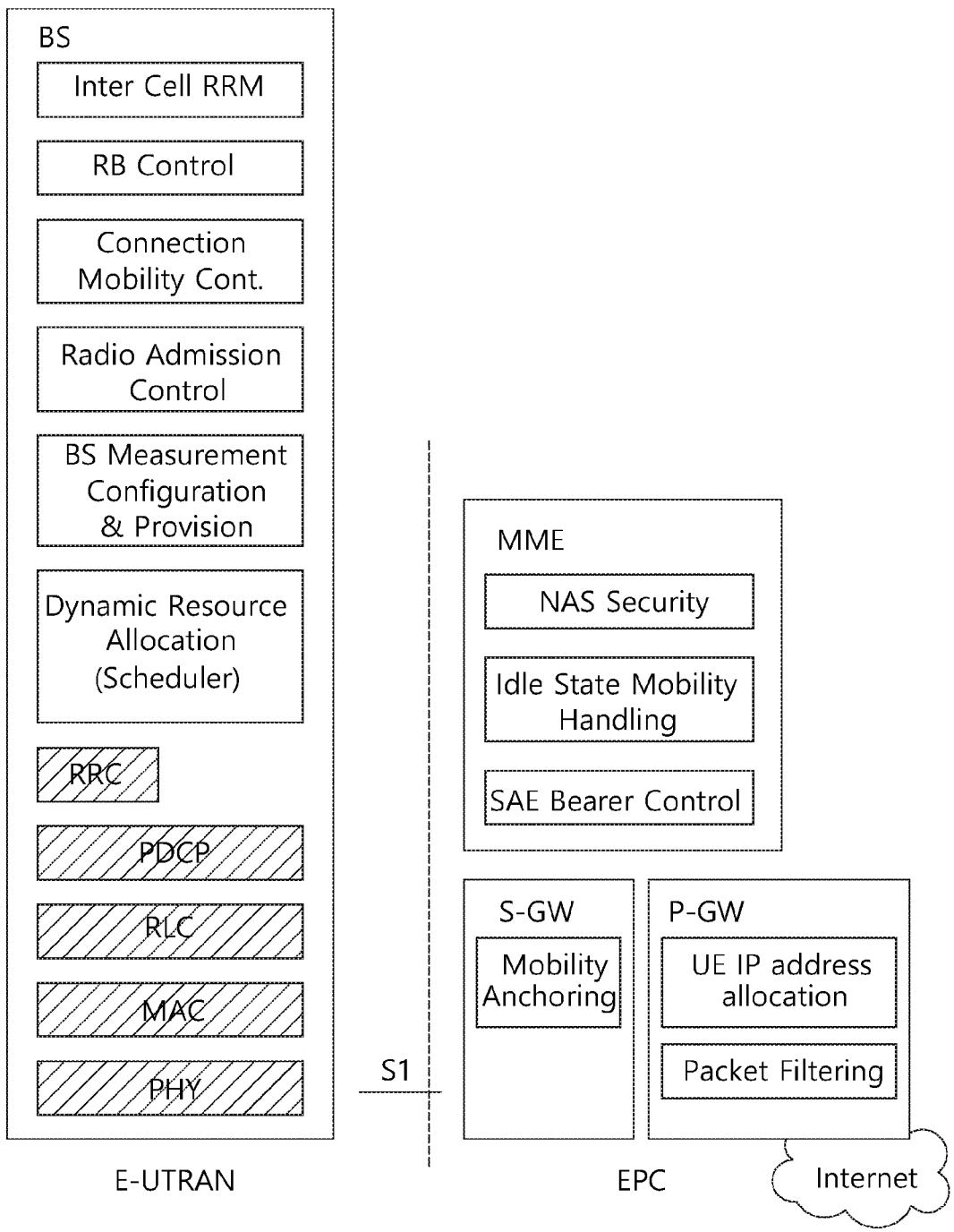
FIG. 2 is a block diagram showing a functional split between an E-UTRAN and an EPC.

FIG. 2 is a block diagram showing a functional split between an E-UTRAN and an EPC. The slashed box represents a radio protocol layer, and the white box represents a functional entity of the control plane.

Referring to FIG. 2, the eNodeB carries out diverse functions, such as (1) Radio Resource Management (RRM) functions, such as Radio Bearer Control, Radio Admission Control, Connection Mobility Control, Dynamic Resource Allocation to a UE, (2) Internet Protocol (IP) header compression and user data stream encryption, (3) routing of user plane data to the S-GW, (4) scheduling and transmission of paging messages, (5) scheduling and transmission of broadcast information, and (6) measurement for mobility and scheduling and measurement report configuration.

The MME carries out diverse functions, such as (1) Non-Access Stratum (NAS) signaling, (2) NAS signaling security, (3) Idle mode UE Reachability, (4) Tracking Area list management, (5) Roaming, and (6) Authentication.

Herein, a Tracking Area (TA) corresponds to a standard for a minimum unit for determining the final position of the user equipment, and the Tracking Area is configured in cell units or a group of multiple cells. In case the UE deviates from the TA, the UE transmits a Tracking Area Update (TAU) request message to the eNodeB. The eNodeB delivers the TAU request message to the MME, and the MME updates the Tracking Area of the UE. Information on the Tracking Area, which is updated in accordance with the request made by the UE, is transmitted to the UE by a Tracking Area Update Authorization message. The UE determines whether or not a next Tracking Area Update request is to be made based on a Tracking Area Identifier list, which is included in the received Tracking Area Update Authorization message.

The S-GW performs functions, such as (1) mobility anchoring, (2) lawful interception, and so on. And, the PDN-Gateway (P-GW) performs functions, such as (1) UE internet protocol (IP) allocation, (2) packet filtering, and so on.

Layers of the radio interface protocol between the UE and the network may be categorized as a first layer (L1), a second layer (L2), and a third layer (L3) based on the three (3) lower-level layers of an Open System Interconnection (OSI) model, which is widely known in the communication system. Herein, a physical layer, which belongs to the first layer, provides information transfer services by using a physical channel, and a radio resource control (hereinafter referred to as RRC), which is positioned in the third layer, performs a function of controlling the radio resource between the UE and the network.

Figure 3:
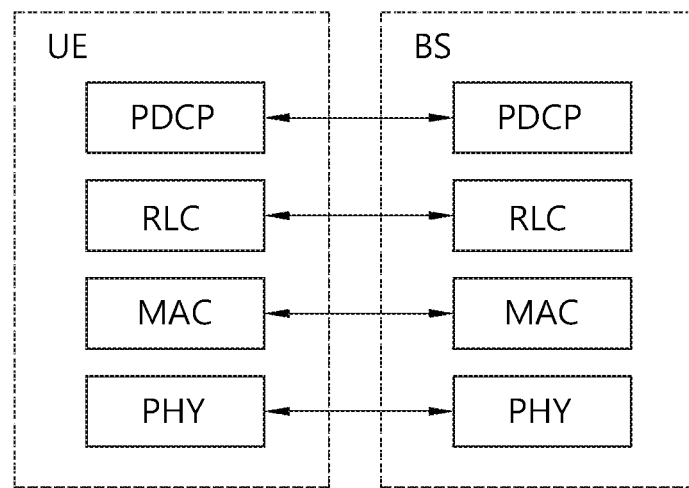
FIG. 3 is a block diagram showing a radio protocol architecture respective to a user plane.
Figure 4:
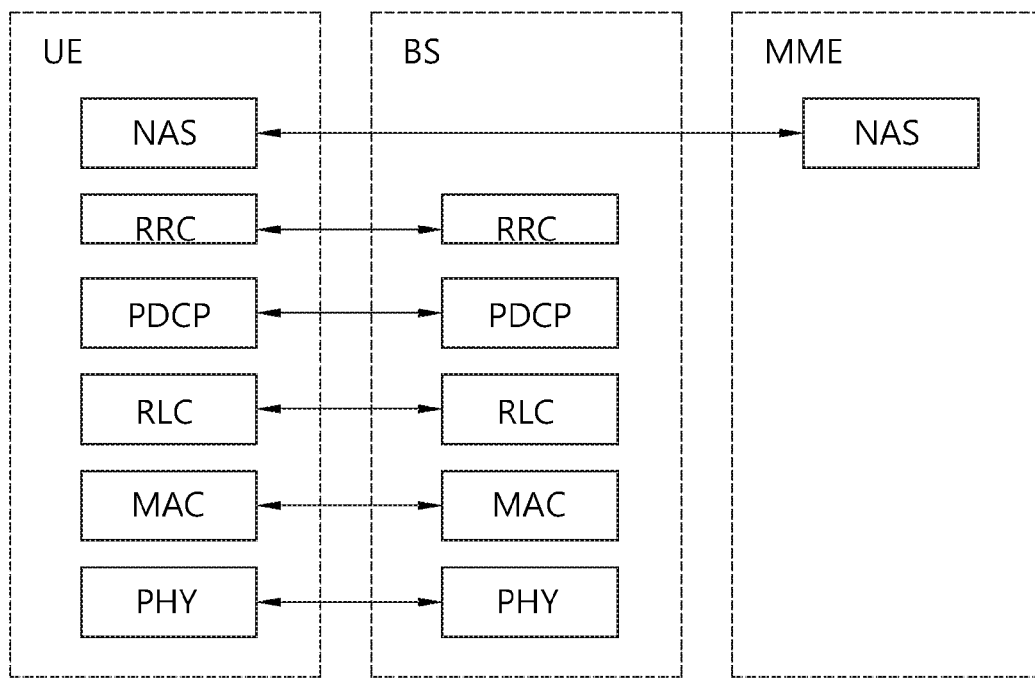
FIG. 4 is a block diagram showing a radio protocol architecture respective to a control plane.

FIG. 3 is a block diagram showing a radio protocol architecture respective to a user plane. FIG. 4 is a block diagram showing a radio protocol architecture respective to a control plane. The drawings illustrate an architecture of a radio interface protocol. The user plane corresponds to a protocol stack for user data transmission, and the control plane corresponds to a protocol stack for control signal transmission.

Referring to FIG. 3 and FIG. 4, a physical (PHY) layer provides information transfer services to a higher layer by using a physical channel. The PHY layer may be connected to its higher layer, which corresponds to a Medium Access Control (MAC) layer, through a transport channel, and data move (or are transported) to and from the MAC layer and the PHY layer through the transport channel. Moreover, data are transported between different PHY layers, i.e., the PHY layer of the transmitting end and the PHY layer of the receiving end, through the physical channel.

The MAC layer of the second layer provides services to a Radio Link Control (RLC) layer, which corresponds to a higher layer, through a logical channel. The RLC layer of the second layer supports the transmission of reliable data. Depending upon the data transmission method, three different operation modes, a Transparent Mode (TM), an Unacknowledged Mode (UM), and an Acknowledged Mode (AM), exist in the RLC layer. The AM RLC provides two-way data transport (or transmission) services, and, when a transmission of a RLC Protocol Data Unit (PDU) is failed, the AM RLC supports its re-transmission.

A Packet Data Convergence Protocol (PDCP) of the second layer performs a header compression function, which reduces the size of an IP packet header.

A Radio Resource Control (hereinafter referred to as RRC) layer of the third layer is defined only in the control plane. The RRC layer is associated with the configuration, re-configuration, and release of the Radio Bearers (hereinafter referred to as RBs), and, therefore, performs the function of controlling the logical channels, transport channels, and physical channels. The RB refers to a service that is provided by the second layer for the data delivery (or transport) between the UE and the E-UTRAN. In case an RRC Connection exists between the RRC of the UE and the RRC of the network, the UE is in a RRC Connected Mode, and, otherwise, the UE is in a RRC Idle Mode.

The Non-Access Stratum (NAS) layer, which is located above the RRC layer, performs the functions of Session Management, Mobility Management, and so on.

Figure 5:
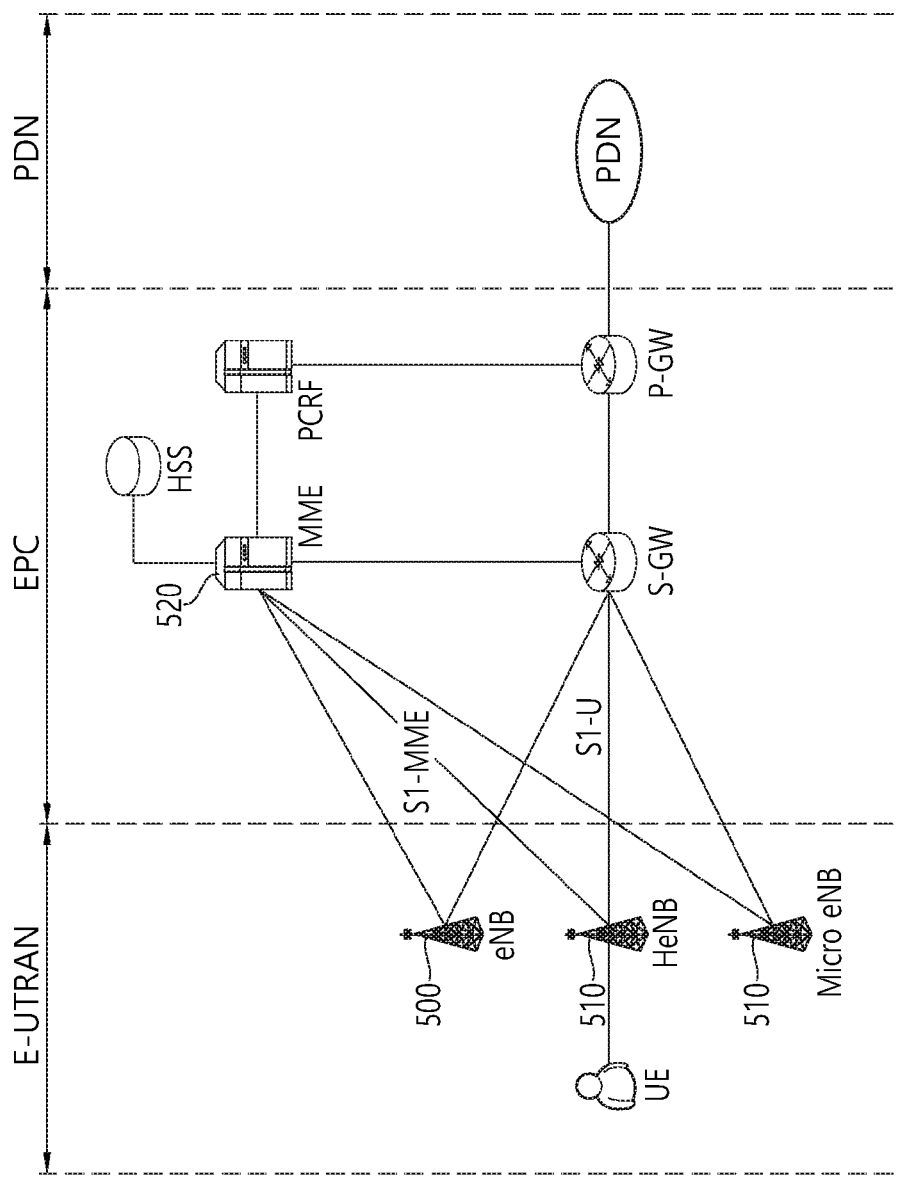
FIG. 5 is a block diagram showing an overall architecture of an E-UTRAN and an EPC within the related art LTE network.

FIG. 5 is a block diagram showing an overall architecture of an E-UTRAN and an EPC within the related art LTE network.

Referring to FIG. 5, the E-UTRAN includes a Macro Cell, which corresponds to a large-sized cell and which is provided by the eNB 500, and a Small Cell, which is provided by Micro eNB, Home evolved Node B (HeNB) 510, and so on. The small cell includes a Metro Cell, an Enterprise Cell, and so on.

The small cell is provided by a low-power radio access eNB having an operation range of approximately several hundreds of meters (m). By reducing the operation range (cell size) by relocating the user equipment to a location that is closer to the eNB, the problems of degraded quality of communication and generation of shadow area, and so on, may be resolved. Additionally, positioning the user equipment and the eNB to be closer to one another is advantageous in that the power consumption of the user equipment may be reduced, and that the installation cost and the repair and maintenance cost may cost less than the related art eNB. According to the usage range and purpose of the usage, the cells may be categorized as a Metro Cell, a Micro Cell, a Pico Cell, and a Femto Cell. And, depending upon the area of installation and the purpose of the services, the cells may be divided into Home, Enterprise, and Hotspot.

Although the HeNB 510 is essentially the same as a general base station, the HeNB 510 is a simple apparatus (or device) that can generally be installed by the user himself (or herself). The HeNB 510 may also be referred to as a home NB (hNB), a Femto-cell, a home cellular base station, and so on. The HeNB 510 operates as a cellular network with respect to the fact that the HeNB 510 performs communication through a general cellular network radio interface and also to the fact that the HeNB 510 performs alternative network access, such as an Internet access, to a core network (CN) of a cellular network provider through optical communication, DSL, cable subscriber network, and so on. Generally, the HeNB 510 has a low radio transmission output power as compared to the base station of a radio (or wireless) communication service provider. Therefore, the coverage of a service that is provided by the HeNB 510 is generally smaller than the coverage of service that is provided by the eNB 500. Due to such characteristics, in the aspect of service coverage, the cell that is being provided by the HeNB 510 may also be referred to as a Femto cell.

In the related art, multiple cells including a macro cell and/or a small cell were each directly connected to one MME 520 through a S1-MME interface, thereby generating a signaling traffic of the control plane. More specifically, one MME 520 processed the signaling messages respective to multiple users.

In such network structure, the MME signaling load increases in order to carry out Session Management, Mobility Management, Paging, Tracking Area updating. More specifically, as the density of small cells increases, the MME signaling for the handover processing between the small cells or between small cells and the macro cell increases significantly. Additionally, problems may occur in that an overload of unnecessary paging may occur in the eNB 500 and small cells and that the number of S1-MME links per MME 520 increases significantly. Herein, in a case when user equipments are located only in the small cell, unnecessary paging refers to a case when paging is not only sent from the macro cell to the user equipments but also sent from all small cells belonging to the tracking area to the user equipments. This is because position information indicating in which cell the UE is located is unknown. Additionally, since a packet size and information size that can be sent through the S1-MME interface during one session is very limited, the overhead of the MME signaling inevitably becomes larger.

Additionally, an overhead channel of the MME includes a paging message transmission, a paging area update, and so on. Herein, Paging refers to a signal that is used for an initial network connection configuration respective to a UE. An efficient paging procedure corresponds to temporarily waking the UE during a predetermined period of time in order to observe the paging information received from the system. During most of the remaining time, the UE preserves its battery power by remaining in a sleep state without any receiver processing. More specifically, in order to indicate whether or not paging messages are being transmitted to the user equipment, the system may transmit paging indicators through a Paging Indicator Channel (PICH). Additionally, the system may transmit the paging messages through a Paging Channel (PCH). The user equipment may quickly receive paging indicators, and the user equipment may then decide whether or not the paging message will be transmitted to the corresponding user equipment. In case the paging message is transmitted to the user equipment, the paging channel is processed. And, in case no paging message is transmitted to the corresponding paging channel, the user equipment may immediately return to the sleep mode. The paging indicator channel and the paging channel correspond to overhead channels that are used for all user equipments. Therefore, such overhead channels generally seek to allow even the user equipments having the worst channel status to receive the paging indicators and the paging messages with reliability. Therefore, the paging indicators and the paging messages are transmitted at a sufficiently low rate and a sufficiently high transmission power. Moreover, since the positions of the user equipments that are being paged may not be notified, the system generally transmits the paging indicators and the paging messages from all of the cells within a large area. The process of transmitting the paging indicators and the paging messages at a low rate and/or a high transmission power via overhead channels throughout a large area may consume a considerable amount of radio resources.

Accordingly, this specification proposes a solution that can disperse (or distribute) the signaling load, which was concentrated in one MME, and that can, at the same, time, reduce the paging overhead. More specifically, by including a Micro MME in the eNB, which provides the macro cell, the load that was concentrated in one MME due to the multiple cells, in the LTE structure, may be distributed. More specifically, by using a hierarchical structure of a macro MME and a micro MME, an efficient mobility management and EPS session management may be provided. Herein, a hierarchical structure corresponds to a structure, wherein a micro MME being connected to one macro cell performs mobility management within the macro cell or tracking area, and wherein one macro MME manages user mobility that occurs between the macro cells. Accordingly, by allowing the micro MME to manage the connection management, handover, paging area update, and so on, between the small cells, such processes may be prevented from reaching an Evolved Packet Core (EPC) network.

Thus, the influence caused by the overhead on the Evolved Packet Core (EPC) network may be minimized.

In this specification, in order to express a hierarchical structure between MMEs, a macro MME may be specified as a first MME, and a micro MME may be specified as a second MME. The first MME manages a plurality of macro cells, and the second MME manages one of the macro cells among the plurality of macro cells. More specifically, the second MME belongs to the first MME and may, therefore, be viewed as an Entity managing only part of the area that is managed by the first MME. Additionally, in order to represent an exemplary embodiment wherein one micro MME corresponds to one Tracking Area (TA), the micro MMEs may respectively specified as a first micro MME and a second micro MME. Micro S-GWs may be respectively specified as a first micro S-GW and a second micro S-GW. A macro MME may be specified as a first macro MME. More specifically, the first micro MME and the first micro S-GW collectively manage the first TA, the second micro MME and the second micro S-GW collectively manage the second TA, and the first macro MME manages both of the first TA and the second TA. Herein, also, the first micro MME and the second micro MME belong to the first macro MME and may, therefore, be collectively viewed as an Entity managing only part of the area that is managed by the first macro MME. Therefore, the terms used in this specification may be recognized as specified herein.

Figure 6:
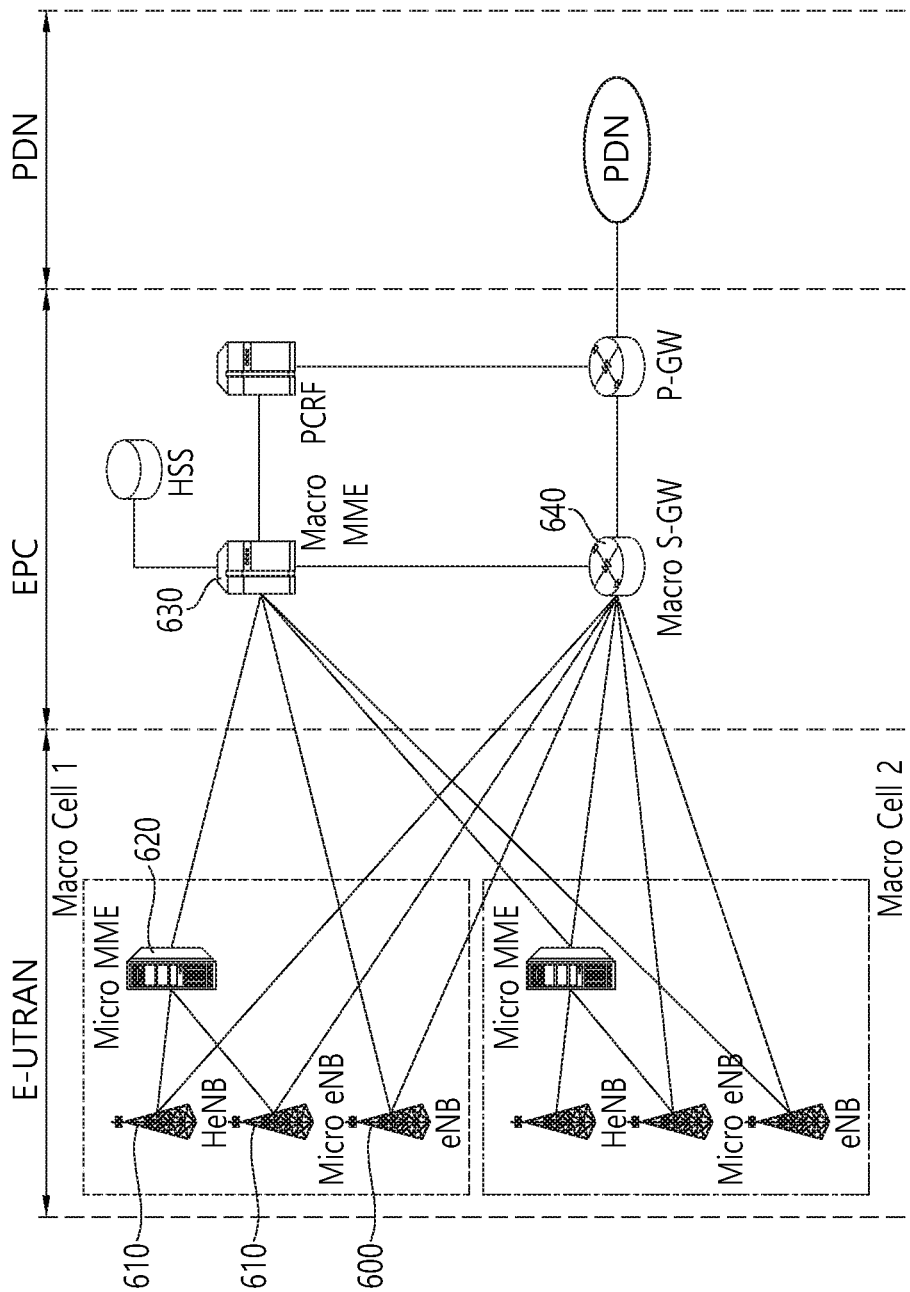
FIG. 6 is a block diagram showing an overall architecture of an E-UTRAN and an EPC within a LTE network according to a first exemplary embodiment of this specification.

FIG. 6 is a block diagram showing an overall architecture of an E-UTRAN and an EPC within a LTE network according to a first exemplary embodiment of this specification.

The description of the terms Macro and Micro that are used in the examples shown in FIG. 6 to FIG. 10, which will hereinafter be described in detail, is as follows. The macro cell refers to a large cell that is provided by eNB 600, and the micro cell refers to a type of small cell having a comparatively smaller service coverage. The macro MME refers to a control node processing signaling between the user equipments, which exist in a plurality of macro cells or small cells, and the core network (CN), and the micro MME refers to a control node that is connected to the base station (eNB) of the macro cell and that establishes connection between the user equipments existing in the small cells and the macro MME. At least one micro MME and one macro MME have a hierarchical structure. Similarly, the macro S-GW refers to a local mobility anchor for a data bearer, when the user equipment moves to and from the macro cell and the small cells. The micro S-GW refers to a local mobility anchor for a data bearer, when the user equipment moves to and from the small cells, and the micro S-GW is connected to the macro S-GW. At least one micro S-GW and one macro S-GW have a hierarchical structure (or architecture).

In a first exemplary embodiment of this specification, the micro MME 620 manages the area of one macro cell. Herein, this illustrates a case when each of the small cells existing in the one macro cell is directly connected to the micro MME 620, and when the small cells are not directly connected to the micro S-GW. More specifically, each of the small cells is connected to the macro MME 630 through the micro MME 620, and mobility management may be performed accordingly. Additionally, by being connected to the macro S-GW 640 mobility anchoring that occurs between the macro cell and/or small cells may be performed. At this point, each of the small cells may be respectively connected to each of the micro MME 620 and the macro S-GW 640 through a new interface or the convention interface 51.

According to the first exemplary embodiment, load that was concentrated in one macro MME 630 with respect to multiple cells were distributed by using a hierarchical structure using a macro MME. Accordingly, a more efficient mobility management may be performed. Additionally, in case the micro MME supports the user equipments of the small cells, and in case the user equipments are positioned in the small cells, instead of having all of the small cells within the tracking area transmit paging to the user equipment, the macro cell may transmit the paging. In this case, more specifically, based on the information indicating in which cell among the small cells the user equipment is located, the paging may delivered to the small cells. The information indicating in which specific cell the user equipment is located may be known by the micro MME through information on the last cell position in which the user equipment was located and through a report made by the user equipment when a handover occurs. This reduces the paging area unit, which may eventually result in a decrease in the paging overhead.

Figure 7:
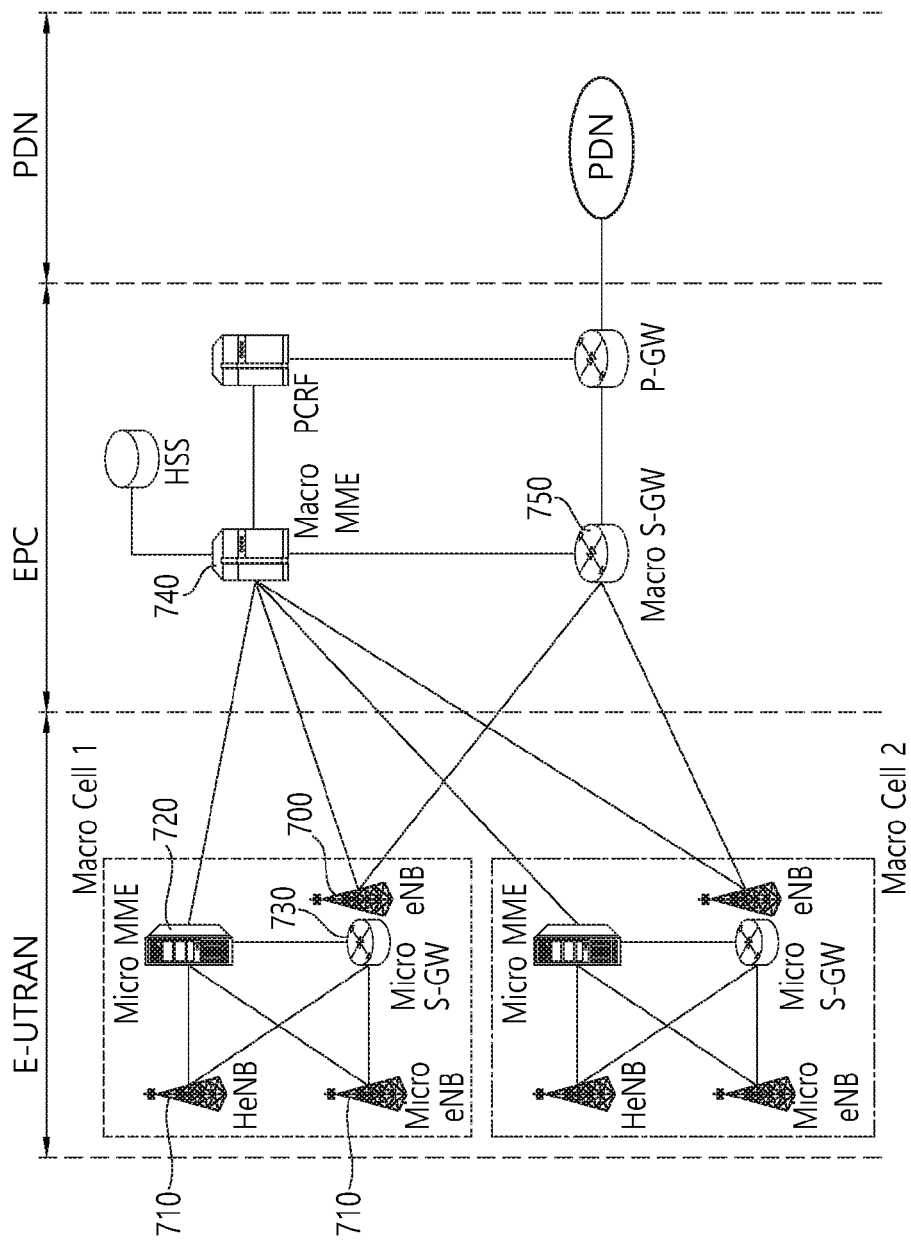
FIG. 7 is a block diagram showing an overall architecture of an E-UTRAN and an EPC within a LTE network according to a second exemplary embodiment of this specification.

FIG. 7 is a block diagram showing an overall architecture of an E-UTRAN and an EPC within a LTE network according to a second exemplary embodiment of this specification.

In the second exemplary embodiment of this specification, the micro MME 720 manages the area of one macro cell. Herein, the second exemplary embodiment represents a case when each of the small cells existing in the one macro cell is directly connected to the micro MME 720, and when each of the small cells is also directly connected to the micro S-GW 730. More specifically, each of the small cells is connected to the micro MME 720, thereby allowing mobility management to be carried out. Additionally, by being connected to the micro S-GW 730 mobility anchoring that occurs between the small cells may be performed. At this point, each of the small cells may be respectively connected to each of the micro MME 720 and the micro S-GW 730 through a new interface or the convention interface S1.

According to the second exemplary embodiment, load that was concentrated in one macro MME 740 with respect to multiple cells were distributed by using a hierarchical structure using a macro MME. Accordingly, a more efficient mobility management may be performed. Additionally, in case the micro MME supports the user equipments of the small cells, and in case the user equipments are positioned in the small cells, instead of having all of the small cells within the tracking area transmit paging to the user equipment, the macro cell may transmit the paging. In this case, more specifically, based on the information indicating in which cell among the small cells the user equipment is located, the paging may delivered to the small cells. The information indicating in which specific cell the user equipment is located may be known by the micro MME through information on the last cell position in which the user equipment was located and through a report made by the user equipment when a handover occurs. This reduces the paging area unit, which may eventually result in a decrease in the paging overhead.

Figure 8:
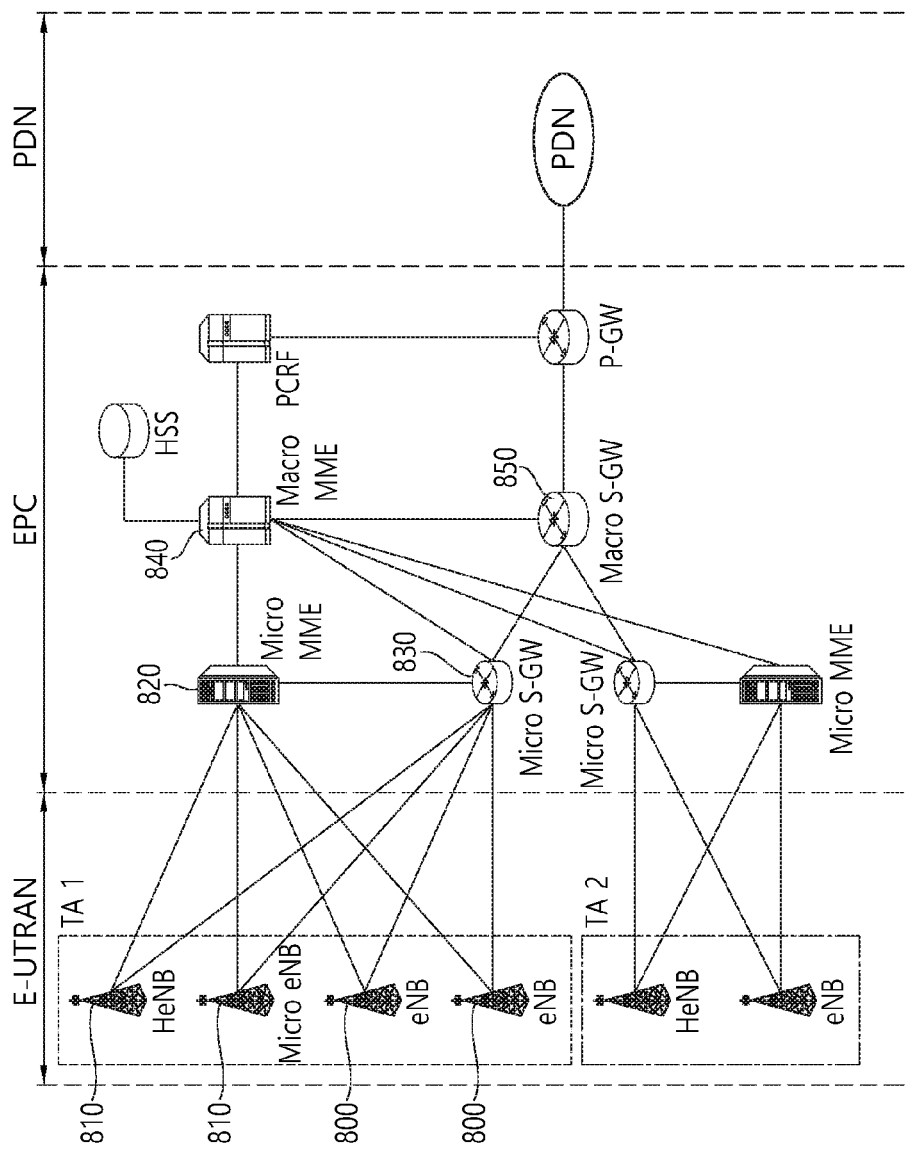
FIG. 8 is a block diagram showing an overall architecture of an E-UTRAN and an EPC within a LTE network according to a third exemplary embodiment of this specification.

FIG. 8 is a block diagram showing an overall architecture of an E-UTRAN and an EPC within a LTE network according to a third exemplary embodiment of this specification.

In the third exemplary embodiment of this specification, the micro MME 820 manages one tracking area. Herein, the third exemplary embodiment represents a case when each of the macro cell and/or small cells existing in the one tracking area is directly connected to the micro MME 820, and when each of the macro cell and/or small cells is also directly connected to the micro S-GW 830. Referring to FIG. 8, it is apparent that the micro MME, the micro S-GW, and the tracking area are in a one-to-one correspondence. More specifically, the first micro MME and the first micro S-GW manage the first tracking area (TA), and the second micro MME and the second micro S-GW manage the second tracking area (TA).

Each of an eNB of a macro cell and/or a HeNB of a small cell belonging to the one tracking area may be connected to the micro MME 820, so as to allow mobility management to be performed or to receive paging. Additionally, the eNB of the macro cell and/or the HeNB of the small cell belonging to the one tracking area may be connected to the micro S-GW 830, so as to allow mobility anchoring, which occurs within the tracking area, to be performed.

According to the third exemplary embodiment, load that was concentrated in one macro MME 840 with respect to multiple cells were distributed by using a hierarchical structure using a macro MME. Accordingly, a more efficient mobility management may be performed. Additionally, in case the micro MME supports the user equipments of the small cells, and in case the user equipments are positioned in the small cells, instead of having all of the small cells within the tracking area transmit paging to the user equipment, the macro cell may transmit the paging. In this case, more specifically, based on the information indicating in which cell among the small cells the user equipment is located, the paging may delivered to the small cells. The information indicating in which specific cell the user equipment is located may be known by the micro MME through information on the last cell position in which the user equipment was located and through a report made by the user equipment when a handover occurs. This reduces the paging area unit, which may eventually result in a decrease in the paging overhead.

A comparison of relative values of a control overhead that occurs during a handover according to the first exemplary embodiment, the second exemplary embodiment, and the third exemplary embodiment of this specification with respect to the conventional LTE structure is shown below in the following Table.

the macro cell in a macro MME. However, since the small cell is directly connected to the micro MME, n number of signaling overhead occurs with respect to the small cell in the micro MME. Since one micro MME is allocated for each macro cell, the number of micro MMEs is the same as the number of macro cells. Accordingly, lm number of signaling overhead occurs between the macro MME and the micro MME. Therefore, in the first exemplary embodiment a total of lm+lmn+lm number of signaling overhead is generated.

In the second exemplary embodiment, with the exception for the presence of the micro S-GW, the rest of the embodiment is the same as the first exemplary embodiment. Therefore, just as in the first exemplary embodiment, lm number of signaling overhead occurs with respect to the macro cell in a macro MME. However, since the small cell is directly connected to the micro MME, n number of signaling overhead occurs with respect to the small cell in the micro MME. Since one micro MME is allocated for each macro cell, the number of micro MMEs is the same as the number of macro cells. Accordingly, lm number of signaling overhead occurs between the macro MME and the micro MME. Therefore, in the second exemplary embodiment, a total of lm+lmn+lm number of signaling overhead is generated.

In the third exemplary embodiment, since one specific tracking area and one specific micro MME is in a one-to-one correspondence, the number of tracking areas is the same as the number micro MMEs. Since the macro MME is connected to all of the tracking areas, 1 number of signaling overhead is generated. However, since the micro MME is connected to the macro cell and the small cells within the tracking area, mn number of signaling overhead is generated. Since the tracking area and the micro MME are in a one-to-one correspondence, 1 number of signaling overhead is generated between the macro MME and the micro MME. Therefore, in the third exemplary embodiment, a total of 1+lmn+1 number of signaling overhead is generated.

In the conventional method, one macro MME managed the paging and sent a paging from the macro cell to the user equipment, and all of the small cells belonging to the tracking area sent a paging to the user equipment. However,

TABLE 1

|  | Conventional LTE Architecture | First Embodiment | Second Embodiment | Third Embodiment |
| --- | --- | --- | --- | --- |
| Macro MME | lm + lmn | lm | lm | 1 |
| Micro MME | 0 | n | n | mn |
| MME between Macro MME and Micro MME | 0 | lm | lm | 1 |
| Total | lm + lmn | lm + lmn + lm | lm + lmn + lm | 1 + lmn + 1 |

When the micro MME is actually being used, this corresponds to a comparison that is approximately made on the signaling overhead of each network structures by using relative values. For example, it will be assumed that one TA exists per macro MME, that m number of macro cells exists per TA, and that n number of small cells exists per macro cell.

In the conventional LTE structure, lm number of signaling overhead occurs with respect to the macro cell in a macro MME. lmn number of signaling overhead occurs with respect to the small cell, and, thus, a total of lm+lmn number of signaling overhead is generated.

In the first exemplary embodiment, just as in the related art, lm number of signaling overhead occurs with respect to in this specification, a micro MME sends a paging to the user equipment, and, since the micro MME has the position information of the user equipment within the tracking area, only the small cells having the user equipment located therein may send a paging to the user equipment. By doing so, in case a region having a concentrated distribution of the small cells exists, the paging overhead may be significantly decreased, and the consumption of radio resources that are used for the paging may also be reduced. This may be verified in the example of the third exemplary embodiment in Table 1, wherein lm number of overhead may be reduced as compared to when using the conventional LTE structure.

Figure 9:
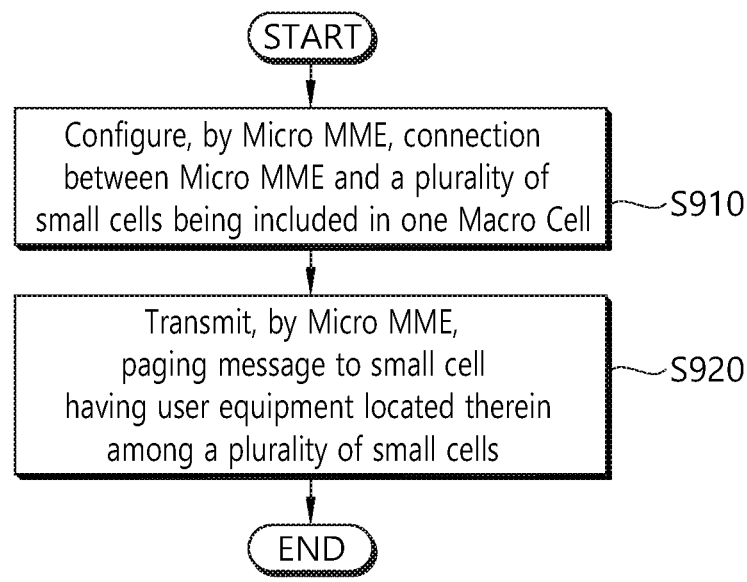
FIG. 9 is a procedure flow chart showing a situation in which an exemplary embodiment of this specification is being applied.

FIG. 9 is a procedure flow chart showing a situation in which an exemplary embodiment of this specification is being applied.

Referring to FIG. 9, the exemplary embodiment of this specification includes the two illustrated steps.

According to step S910, which is shown in the drawing, a micro MME configures a connection with a plurality of small cells included in one macro cell. By including a micro MME within the conventional architecture, wherein the macro MME is directly connected to a plurality of macro cells and/or small cells, a hierarchical architecture may be configured between the macro MME and the micro MME. More specifically, the micro MME manages one specific macro cell, and the macro MME manages the plurality of macro cells.

According to step S920, which is shown in the drawing, among the plurality of small cells, the micro MME transmits a paging message to the small cell having a user equipment located therein. Herein, the micro MME carries the position information of the small cell having a user equipment located therein. Therefore, without having to transmit paging messages to all of the small cells, the micro MME may transmit a paging message to the specific small cell having the user equipment located therein.

In order to express the hierarchical architecture between the MMEs, the macro MME may specify the macro MME as a first MME and the micro MME as the second MME. More specifically, the second MME belongs to the first MME and may be viewed as an entity managing only part of the area managed by the first MME.

Figure 10:
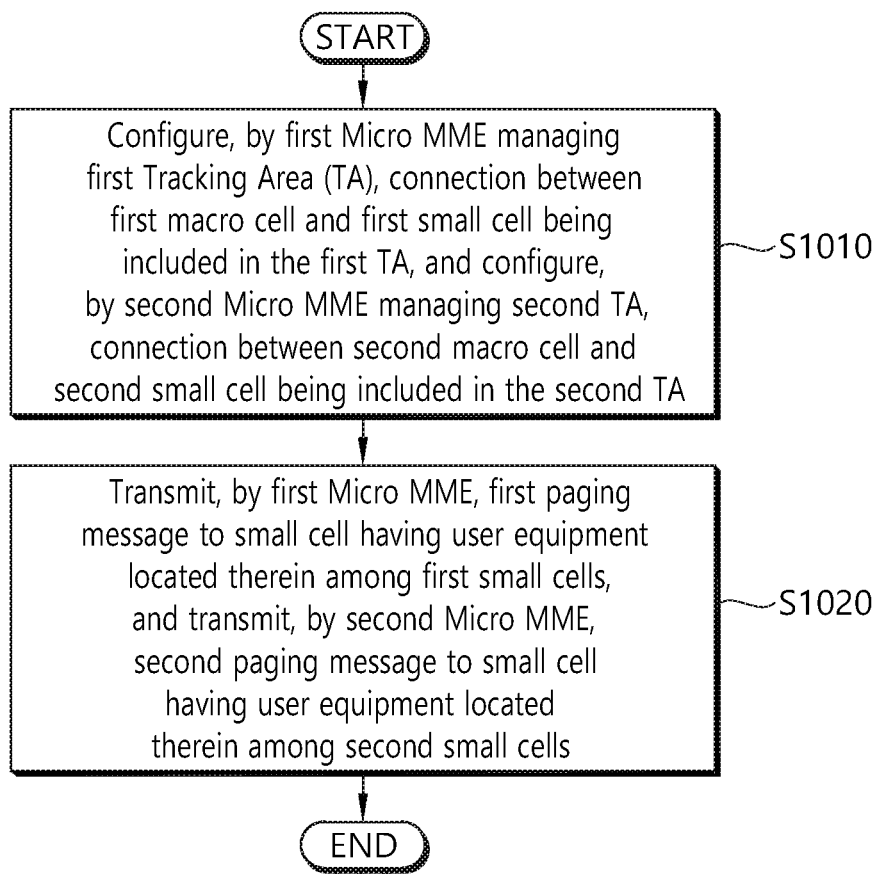
FIG. 10 is a procedure flow chart showing a situation in which another exemplary embodiment of this specification is being applied.

FIG. 10 is a procedure flow chart showing a situation in which another exemplary embodiment of this specification is being applied.

Referring to FIG. 10, the other exemplary embodiment of this specification includes the two illustrated steps.

In order to represent a configuration, wherein one micro MME corresponds to one Tracking Area (TA), the micro MME may be specified as a first micro MME and a second micro MME. Herein, the first micro MME and the second micro MME belong to a first macro MME and may be collectively viewed as an entity managing only part of the area being managed by the first macro MME.

According to step S1010, which is shown in the drawing, the first micro MME managing a first Tracking Area (TA) configures a connection with a first macro cell and a first small cell, which are included in the first TA. Additionally, the second micro MME managing a second Tracking Area (TA) configures a connection with a second macro cell and a second small cell, which are included in the second TA. Unlike the case when the macro MME managed all of the TAs, by including one micro MME managing one TA within the structure (or architecture), a hierarchical architecture may be configured between each of the micro MMEs and the macro MME.

According to step S1020, which is shown in the drawing, among the first small cells, the first micro MME transmits a first paging message to the first small cell having a user equipment located therein, and, among the second small cells, the second micro MME transmits a second paging message to the second small cell having a user equipment located therein. As described above, each of the first micro MME and the second micro MME independently performs paging management with respect to the TA managed by each of the first and second micro MMEs. Herein, the first micro MME carries position information of the first small cell having a user equipment located therein, and the second micro MME carries position information of the second small cell having a user equipment located therein. Therefore, without having to transmit paging messages to all of the small cells, the first micro MME and the second micro MME may transmit a paging message to the respective specific small cell having the user equipment located therein.

Figure 11:
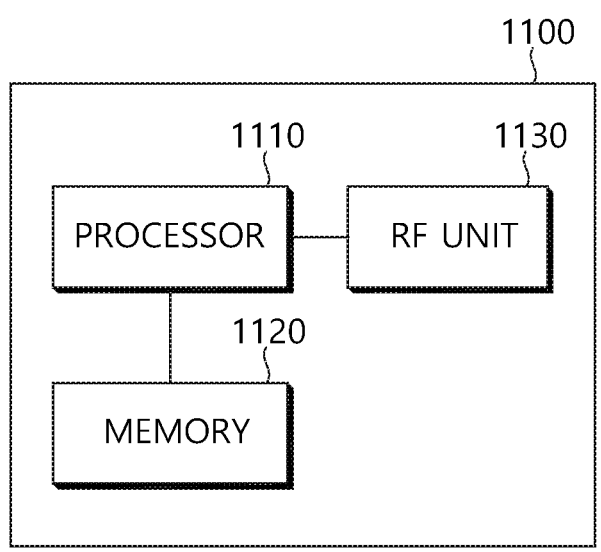
FIG. 11 is a block diagram showing a wireless communication system in which the example of this specification can be applied.

FIG. 11 is a block diagram showing a wireless apparatus in which the example of this specification can be applied. Such apparatus may be embodied as a part of the UE and may be embodied as a part of the eNB and the HeNB. Additionally, such apparatus may also be embodied as a part of the core network (CN). The wireless apparatus 1100 may include a processor 1110, a memory 1120, and a radio frequency (RF) unit 1130.

The processor 1110 may be configured to implement proposed functions, procedures and/or methods described in this description. Layers of the radio interface protocol may be implemented in the processor 1110. The processor 1110 may handle a procedure explained above. The memory 1120 is operatively coupled with the processor 1110, and the RF unit 1130 is operatively coupled with the processor 1110.

The processor 1110 may include application-specific integrated circuit (ASIC), other chipset, logic circuit and/or data processing device. The memory 1120 may include read-only memory (ROM), random access memory (RAM), flash memory, memory card, storage medium and/or other storage device. The RF unit 1130 may include baseband circuitry to process radio frequency signals. When the embodiments are implemented in software, the techniques described herein can be implemented with modules (e.g., procedures, functions, and so on) that perform the functions described herein. The modules can be stored in memory 1120 and executed by processor 1110. The memory 1120 can be implemented within the processor 1110 or external to the processor 1110 in which case those can be communicatively coupled to the processor 1110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for a mobility management for heterogeneous network environment in a wireless communication system including a first Mobility Management Entity (MME) and a second MME, the method comprises:

configuring, by the second MME, a connection between the second MME and a plurality of small cells being included in one macro cell, wherein the second MME corresponds to a Micro MME managing the one macro cell, and wherein the first MME corresponds a Macro MME being connected to the second MME so as to manage a plurality of macro cells; and transmitting, by the second MME, a paging message to a small cell in which a user equipment is located, among the plurality of small cells, wherein the paging message is transmitted based on position information respective to a small cell having the user equipment located therein, wherein the plurality of small cells are connected to a Micro Serving Gateway (S-GW) managing the one macro cell, and wherein the Micro S-GW is connected to a Macro Serving Gateway (S-GW) managing the plurality of macro cells.

2. The method of claim 1, wherein the second MME is included in a base station of the one macro cell, and wherein the one macro cell has a service coverage being provided by the base station that is larger than the plurality of small cells.

3. The method of claim 1, wherein the plurality of small cells are directly connected to the Macro S-GW managing the plurality of macro cells.

4. The method of claim 1, wherein position information indicating the small cell in which the user equipment is located is decided based on position information of a last small cell in which the user equipment was previously located and handover information of the user equipment.

5. A method for a mobility management for heterogeneous network environment in a wireless communication system including a first Micro Mobility Management Entity (MME), a second Micro MME, and a first Macro Mobility Management Entity (MME), the method comprises:

configuring, by the first Micro MME managing a first Tracking Area (TA), a connection between a first macro cell and a first small cell being included in the first TA, and configuring, by the second Micro MME managing a second Tracking Area (TA), a connection between a second macro cell and a second small cell being included in the second TA, wherein the first Macro MME is connected to the first Micro MME and the second Micro MME and manages the first TA and the second TA; and transmitting, by the first Micro MME, a first paging message to a small cell in which a user equipment is located, among the first small cells, and transmitting, by the second Micro MME, a second paging message to a small cell in which a user equipment is located, among the second small cells, wherein the first paging message is transmitted based on position information respective to a small cell having the user equipment located therein within the first TA, and wherein the second paging message is transmitted based on position information respective to a small cell having the user equipment located therein within the second TA.

6. The method of claim 5, wherein the first Micro MME is included in a base station of the first macro cell, wherein the second Micro MME is attached to a base station of the second macro cell, wherein the first macro cell has a service coverage being provided by the base station that is larger than the first small cell, and wherein the second macro cell has a service coverage being provided by the base station that is larger than the second small cell.

7. The method of claim 5, wherein the first small cell is connected to a first Micro Serving Gateway (S-GW) managing the first TA, wherein the second small cell is connected to a second Micro Serving Gateway (S-GW) managing the second TA, and wherein the first Micro S-GW and the second Micro S-GW are connected to a Macro Serving Gateway (S-GW) managing the first TA and the second TA.

8. The method of claim 5, wherein position information indicating the small cell in which the user equipment is located is decided based on position information of a last small cell in which the user equipment was previously located and handover information of the user equipment.

* * * * *